(12) United States Patent
Chang et al.

(10) Patent No.: US 8,615,522 B2
(45) Date of Patent: Dec. 24, 2013

(54) COMPUTING DEVICE, STORAGE MEDIUM AND METHOD FOR OUTPUTTING DIMENSION DATA USING THE COMPUTING DEVICE

(75) Inventors: Chih-Kuang Chang, New Taipei (TW); Xin-Yuan Wu, Shenzhen (CN); Jing-Jie Shen, Shenzhen (CN); Jin-Gang Rao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 108 days.

(21) Appl. No.: 13/425,434

(22) Filed: Mar. 21, 2012

(65) Prior Publication Data

US 2013/0046776 A1 Feb. 21, 2013

(30) Foreign Application Priority Data

Aug. 18, 2011 (CN) .......................... 2011 1 0237879

(51) Int. Cl.
*G06F 7/00* (2006.01)
*G06F 17/30* (2006.01)

(52) U.S. Cl.
CPC ...... *G06F 17/30592* (2013.01); *G06F 17/3028* (2013.01)
USPC .............................................. 707/758

(58) Field of Classification Search
None
See application file for complete search history.

(56) References Cited

U.S. PATENT DOCUMENTS

| | | | | |
|---|---|---|---|---|
| 2002/0107859 | A1* | 8/2002 | Tsuyuki | 707/100 |
| 2007/0050268 | A1* | 3/2007 | Han et al. | 705/27 |
| 2010/0318527 | A1* | 12/2010 | Nandy et al. | 707/754 |

OTHER PUBLICATIONS

Kumar, et al., (Jan. 2010), An Information Model for Process Control on Machine Tools, In Proceedings of the 6th CIRP-Sponsored International Conference on Digital Enterprise Technology (pp. 1565-1582), Springer Berlin Heidelberg.*

* cited by examiner

*Primary Examiner* — Jay Morrison
(74) *Attorney, Agent, or Firm* — Altis Law Group, Inc.

(57) ABSTRACT

In a method for outputting dimension data using a computing device, a dimension file is read and searched for at least one dimension keyword. If there is the at least one dimension keyword in the dimension file, dimension data from the dimension file is extracted and stored as one or more structure variables into a structure array. Each of the one or more structure variables is added into a dimension field of a preset general list. Each dimension field in the preset general list is output into an output report according an output position of each dimension field, and the output report is displayed on a display screen.

18 Claims, 5 Drawing Sheets

```
$$ PCD_SKIP_AND_FORGET OUTPUT/F
T(DIST3)=TOL/DISTB,NOMINL,215.9,-0.01,0.01,XAXIS
  OUTPUT/F(LIN3),F(LIN4),T(DIST3)
  OUTPUT/FA(LIN3),FA(LIN4),TA(DIST3)
$$ PCD_SKIP_AND_FORGET OUTPUT/F
T(DIST4)=TOL/DISTB,NOMINL,0,-0.01,0.01,YAXIS
  OUTPUT/F(LIN4),F(),T(DIST4)
  OUTPUT/FA(LIN4),FA(),TA(DIST4)

F(LIN5)=FEAT/LINE,UNBND,CART,22.85999,0,0,1,0,0
  MEAS/LINE,F(LIN5),2
    PTMEAS/CART,22.85999,0,0,0,1,0
    PTMEAS/CART,205.73999,0,0,0,1,0
  ENDMES
```

FIG. 2

| Num | Nom | +TOL | -TOL |
|---|---|---|---|
| 7 | 4.0 | 0.05 | 0.05 |
| 3 | 15.00 | 0.1 | 0.1 |
| | | | |
| 4 | 112.50 | 0.4 | 0.4 |
| 6 | 188.00 | 0.4 | 0.4 |
| 5 | 289.80 | 0.4 | 0.4 |
| 10 | 337.60 | 0.6 | 0.6 |
| 2 | 348.00 | 0.6 | 0.6 |
| 1 | 378.05 | 0.30 | 0.30 |

FIG. 5A

| Num | Nom | +TOL | -TOL |
|---|---|---|---|
| 7 | 4.0 | 0.05 | 0.05 |
| 3 | 15.00 | 0.1 | 0.1 |
| | | | |
| 6 | 188.00 | 0.4 | 0.4 |
| 5 | 289.80 | 0.4 | 0.4 |
| 10 | 337.60 | 0.6 | 0.6 |
| 2 | 348.00 | 0.6 | 0.6 |
| 1 | 378.05 | 0.30 | 0.30 |

FIG. 5B

| Num | Nom | +TOL | -TOL |
|---|---|---|---|
| 1 | 378.05 | 0.30 | 0.30 |
| 2 | 348.00 | 0.6 | 0.6 |
| | | | |
| 4 | 112.50 | 0.4 | 0.4 |
| 5 | 289.80 | 0.4 | 0.4 |
| 6 | 188.00 | 0.4 | 0.4 |
| 7 | 4.0 | 0.05 | 0.05 |
| 10 | 337.60 | 0.6 | 0.6 |

FIG. 5C

COMPUTING DEVICE, STORAGE MEDIUM AND METHOD FOR OUTPUTTING DIMENSION DATA USING THE COMPUTING DEVICE

BACKGROUND

1. Technical Field

The present disclosure relates to data output devices and methods, and more particularly to a computing device, a storage medium and a method for outputting dimension data using the computing device.

2. Description of Related Art

Dimensional Measuring Interface Specification (DMIS) programs are general dimension programs written according to a DMIS standard. However, because objects (e.g. a workpiece) have become more and more complicated and because large amounts of dimension data needs to be output from the DMIS programs, a report of the dimension data usually has to be output manually. Therefore, it is difficult to manage the dimension data efficiently and conveniently, such as sorting or analyzing the dimension data. Furthermore, the dimension data from the DMIS programs may not be quickly and conveniently output for obtaining desired data according to user preferences and requirements.

BRIEF DESCRIPTION OF THE DRAWINGS

FIG. 2 shows partial content of one example of a dimension file.

FIG. 5A, FIG. 5B, and FIG. 5C is a schematic diagram of one embodiment of managing a general dimension list.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
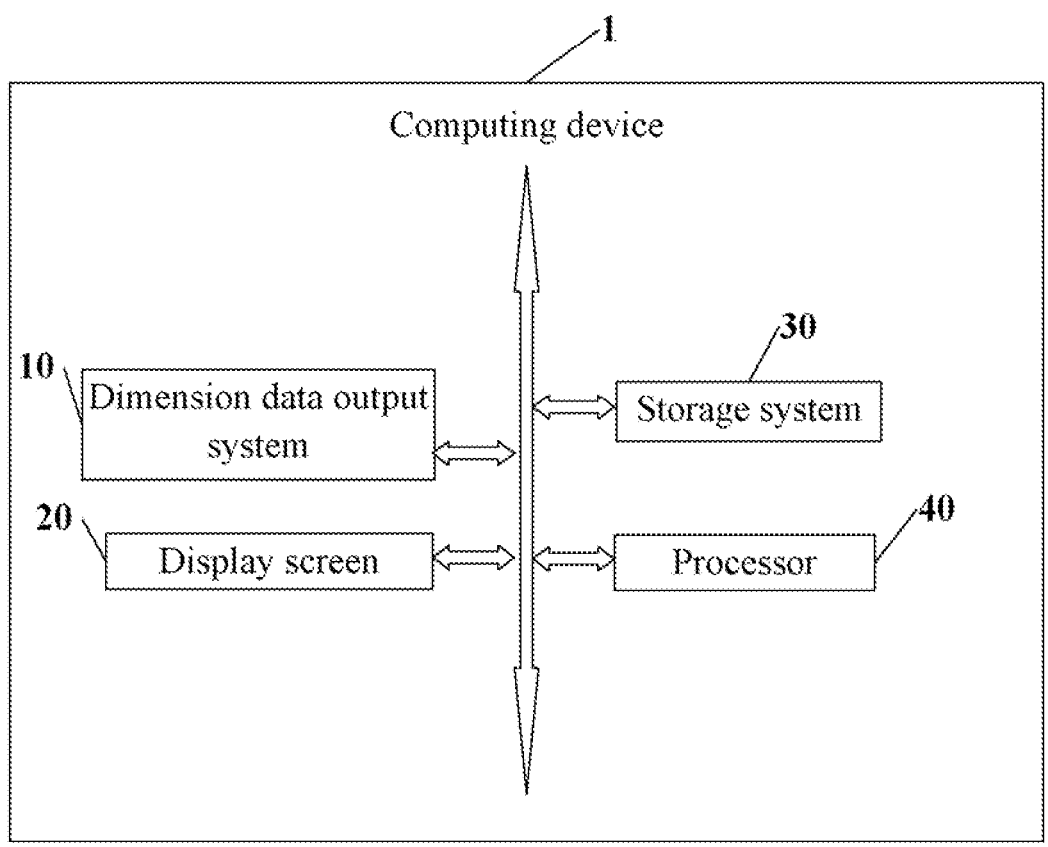
FIG. 1 is a block diagram of one embodiment of a computing device.

FIG. 1 is a block diagram of one embodiment of a computing device 1. The computing device 1 includes a dimension data output system 10, a display screen 20, a storage system 30, and at least one processor 40. The display screen 20 displays data of the computing device 1, such as images of the computing device 1. The storage system 30 stores data of the computing device 1. In one embodiment, the storage system 30 stores a plurality of dimension files relating to different workpieces. The dimension files conform to a Dimensional Measuring Interface Specification (DMIS) standard. In one embodiment, each of the dimension files may include a plurality of codes related to dimension programs. In FIG. 2, partial content of one example of a dimension file is shown. The at least one processor 40 executes one or more computerized codes and other applications of the computing device 1, to provide functions of the dimension data output system 10. The dimension data output system 10 may process the dimension files, extract particular dimension data from the dimension files, and output a user-defined report including the dimension data. The dimension data may relate to dimensions of a workpiece including width and length, for example.

Figure 3:
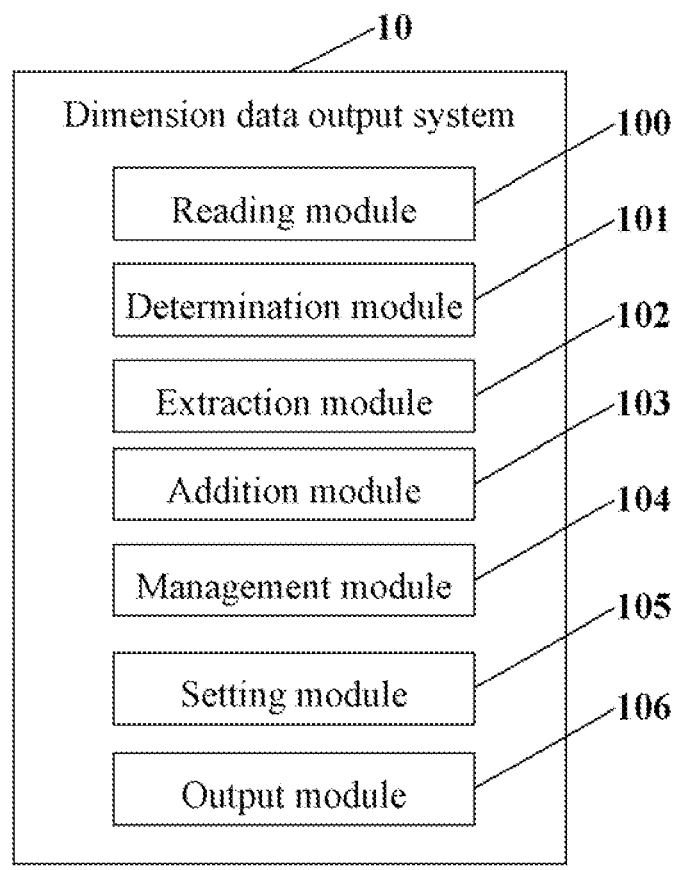
FIG. 3 is a block diagram of function modules of a dimension data output system included in the computing device of FIG. 1.

FIG. 3 is a block diagram of function modules of one embodiment of the dimension data output system 10 of FIG. 1. In one embodiment, the dimension data output system 10 may include a reading module 100, a determination module 101, an extraction module 102, an addition module 103, a management module 104, a setting module 105, and an output module 106. The modules 100-106 comprise computerized codes in the form of one or more programs that are stored in the storage system 30. The computerized codes include instructions that are executed by the at least one processor 40 to provide functions for the modules. Details of each of the modules are given in FIG. 4 and FIG. 5.

Figure 4:
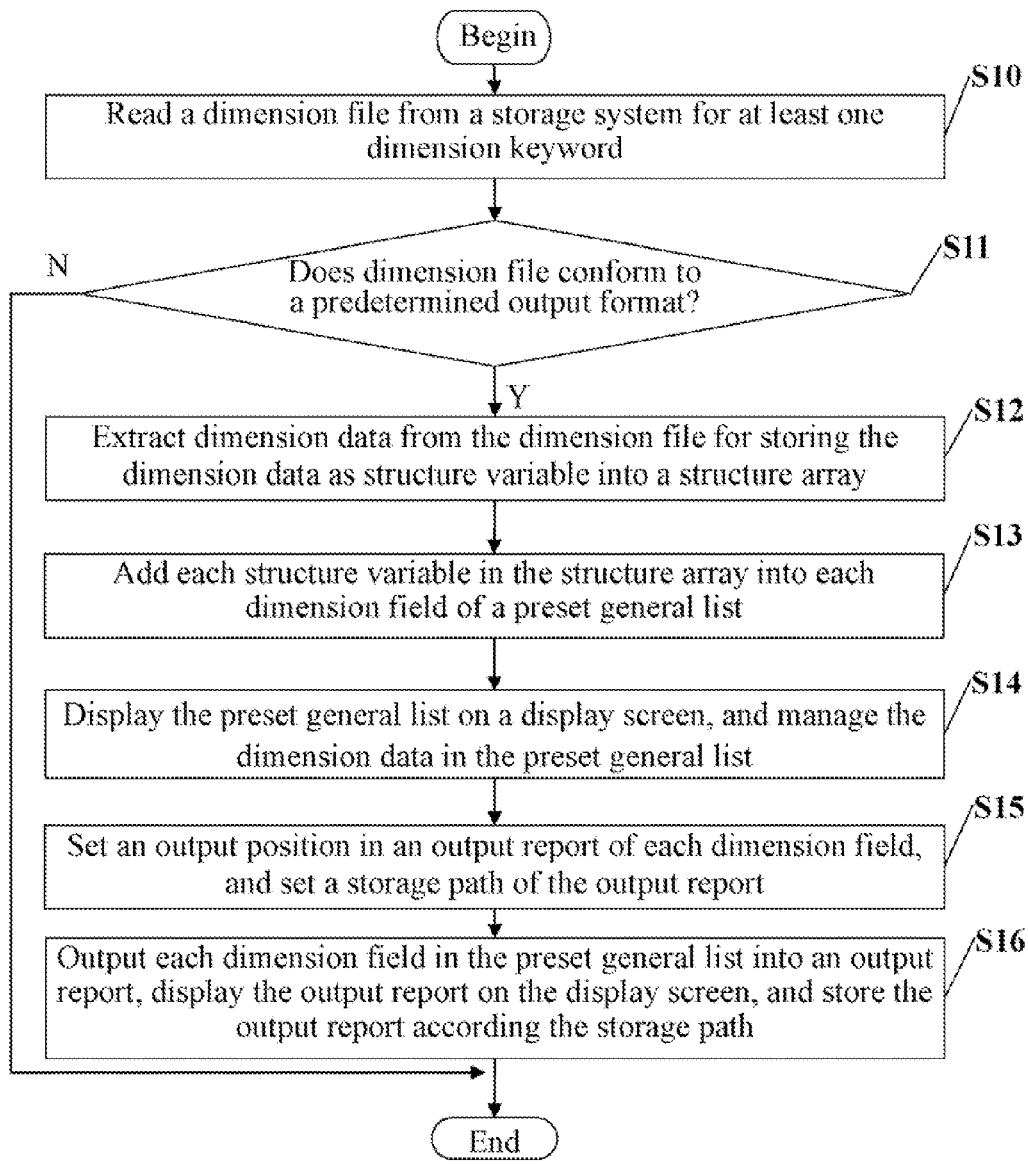
FIG. 4 is a flowchart of one embodiment of output dimension data using the computing device of FIG. 1.

FIG. 4 is a flowchart of one embodiment of a method for outputting dimension data using the computing devices 1 of FIG. 1. Depending on one embodiment, additional blocks may be added, others deleted, and the ordering of the blocks may be changed.

In block S10, the reading module 100 reads a dimension file from the storage system 30, and searches the dimension file for at least one dimension keyword. In one embodiment, the dimension keyword may be determined based on whether the dimension file conforms to a predetermined output format. The predetermined output format governs whether the dimension file includes dimension data that can be output. For example, the dimension keyword may be a string "$$ PCD_SKIP_AND_FORGET".

In block S11, the determination module 101 determines whether the dimension file conforms to the predetermined output format, in response to determining whether the dimension file includes the at least one dimension keyword. If the dimension file includes the at least one dimension keyword, the determination module 101 determines that the dimension file does conform to the predetermined output format, and then the procedure goes to block S12. If the dimension file does not include the at least one dimension keyword, the determination module 101 determines that the dimension file does not conform to the predetermined output format, and the procedure ends.

In block S12, the extraction module 102 extracts the dimension data from the dimension file according to the at least one dimension keyword discovered in the dimension file using a predetermined extraction method, and stores the dimension data as one or more structure variables into a structure array in a storage system 30. The structure variables are members (or elements) that records information of the structure array, and the structure array is a data type that includes the one or more structure variables having the same structure type that stores the dimension data. The dimension data may include identifier (ID) numbers, nominal values, upper tolerances, and lower tolerances of the workpiece, for example. In one embodiment, each structure variable in the structure array may include one ID number, and one nominal value, one upper tolerance value, and one lower tolerance value corresponding to the ID number.

In one embodiment, the predetermined extraction method may include following steps: when the reading module 100 reads a first dimension keyword in the dimension file, the extraction module 102 obtains a dimension block in the dimension file by extracting lines of codes between the first dimension keyword and a blank line in the dimension file if only one dimension keyword exists. If there is a second dimension keyword after the first dimension keyword, the extraction module 102 obtains one or more dimension blocks by extracting the lines of codes between the first dimension keyword and the second dimension keyword in the dimension file. In one embodiment, the dimension block is a block of code in the dimension file that represents the lines of codes between the first dimension keyword and a blank line, or between the first dimension keyword and the second dimension keyword in the dimension file.

The extraction module 102 further extracts the dimension data of each of the dimension blocks by reading codes in a line of an equal symbol ("=") string in each of the dimension blocks. For example, the extraction module 102 obtains the ID number after the "DIST" string before the "=" string, and obtains the nominal value, the upper tolerance, and the lower tolerance by reading three strings separated by commas after the "NOMIL" string. The extraction module 102 further converts formats of the dimension data from string types to float types, and stores each of the dimension blocks as one of the structure variables into the structure array.

As shown in FIG. 2, a first dimension block and a second dimension block are obtained as following: "T(DIST3)=TOL/DISTB,NOMINL,215.9,−0.01,0.01,XAXIS; OUTPUT/F(LIN3),F(LIN4),T(DIST3); OUTPUT/FA(LIN3),FA(LIN4),TA(DIST3)" and "T(DIST4)=TOL/DISTB, NOMINL,0,−0.01,0.01,XAXIS; OUTPUT/F(LIN4),F( ),T(DIST4); OUTPUT/FA(LIN4),FA( ),TA(DIST4)". The extraction module 102 obtains the ID number "3" after the "DIST" string in the first dimension block, and obtains the nominal value "215.9", the upper tolerance "−0.01", and the lower tolerance "0.01". The extraction module 102 converts the formats of the above-mentioned dimension data, and stores the dimension data of "the ID number 3, the nominal value 215.9, the upper tolerance −0.01, and the lower tolerance 0.01" of the first dimension block as a first structure variable into the structure array. The extraction module 102 further obtains the dimension data of "the ID number 4, the nominal value 0, the upper tolerance −0.01, and the lower tolerance 0.01" of the second dimension block as a second structure variable into the structure array.

In block S13, the addition module 103 adds each of the one or more structure variables into dimension fields in a preset general list. The dimension fields in the preset general list may include a field of the ID number, a field of the nominal, a filed of the upper tolerance, and a field of the lower tolerance. That is, each row of the preset general list includes the dimension data in each of the structure variables. For example, the addition module 103 adds the ID numbers in each of the structure variables into the field of ID number, and adds other dimension data in each of the structure variable into corresponding dimension fields.

In block S14, the management module 104 displays the preset general list with the added dimension data on the display screen 20, and manages the dimension data in the preset general list. In one embodiment, the management module 104 may delete one of at least two rows of the dimension data having same ID numbers, sort and/or edit the dimension data in the preset general list according to user preferences.

FIGS. 5A, 5B and 5C provides an example of managing the preset general list. FIG. 5A is the preset general list having the added dimension data. The preset general list includes a plurality of ID numbers, the nominal value, the upper tolerance, and the lower tolerance corresponding to each of the ID numbers. There are two rows having the same ID number "10" in FIG. 5A. As shown in FIG. 5B, the management module 104 may delete one of the two "10" rows of the dimension data according to user preference. The management module 104 may sort the dimension data of the preset general list in a descending or an ascending order according to the ID number, the nominal values, the upper tolerance values, or the lower tolerance values. As FIG. 5C shows, the dimension data of the preset general list are sorted in the ascending order according the ID numbers.

In block S15, the setting module 105 sets an output position in an output report of each dimension field, and sets a storage path of the output report. The output report may be a spreadsheet format for displaying the dimension data. In one embodiment, the setting module 105 may set the output position of the ID numbers to be "A4" position of the output report, that is, the ID numbers are displayed starting at column 1 and row 4.

In block S16, the output module 106 outputs each of the dimension fields in the preset general list into the output report and displays the output report on the display screen 20, and stores the output report in the storage system 30 according the storage path. The output module 106 outputs each of the dimension fields according the output position of each dimension field.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on one embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computing device, comprising:
   a storage system;
   at least one processor; and
   one or more programs that are stored in the storage system and executed by the at least one processor, the one or more programs comprising:
   a reading module that reads a dimension file of a workpiece from the storage system, and searches the dimension file for at least one dimension keyword;
   an extraction module that extracts dimension data from the dimension file according to the at least one dimension keyword using a predetermined extraction method, stores the dimension data as one or more structure variables into a structure array in the storage system, under the condition that the dimension file comprises the at least one dimension keyword, the predetermined extraction method comprising obtaining one or more dimension blocks in the dimension file if there is the next dimension keyword after the dimension keyword, the dimension blocks comprising lines of codes between the dimension keyword and the next dimension keyword, extracting the dimension data of the dimension block by reading codes in a line of a string "=" in the dimension block, converting formats of the dimension data from string types to float types, and storing the dimension data of the dimension block as the structure variable into the structure array;

an addition module that adds each of the one or more structure variables into corresponding dimension fields in a preset general list;

a setting module that sets an output position in an output report of each of the dimension fields;

an output module that outputs each of the dimension fields in the preset general list to the output report according to the output position of each of the dimension fields and displays the output report on a display screen of the computing device.

2. The computing device as claimed in claim 1, wherein the predetermined extraction method comprises:

obtaining a dimension block in the dimension file if there is no next dimension keyword after the dimension keyword in the dimension file, the dimension block comprising lines of code between the dimension keyword and a blank line in the dimension file, and the dimension data of each of the dimension blocks comprising an identifier (ID) number, a nominal value, an upper tolerance, and a lower tolerance corresponding to the ID number.

3. The computing device as claimed in claim 2, wherein the dimension fields in the preset general list comprises a field of the ID number, a field of the nominal, a field of the upper tolerance and a field of the lower tolerance corresponding to the dimension data.

4. The computing device as claimed in claim 2, wherein the one or more programs further comprise a management module that displays the preset general list with the added dimension data on the display screen, and manages the dimension data in the preset general list by deleting one of at least two rows of the dimension data having same ID numbers, sorting and/or editing the dimension data in the preset general list according to user preference.

5. The computing device as claimed in claim 1, wherein the setting module further sets a storage path of the output report, and the output module further stores the output report in the storage system according to the storage path.

6. The computing device as claimed in claim 1, wherein the output report is in a spreadsheet format for displaying the dimension data.

7. A computer-implemented method for outputting dimension data using a computing device, the method comprising:

reading a dimension file of a workpiece from a storage system of the computing device, and searches the dimension file for at least one dimension keyword;

extracting dimension data from the dimension file according to the at least one dimension keyword using a predetermined extraction method, and storing the dimension data as one or more structure variables into a structure array in a storage system, under the condition that the dimension file comprises the at least one dimension keyword, the predetermined extraction method comprising obtaining one or more dimension blocks in the dimension file if there is the next dimension keyword after the dimension keyword and the dimension blocks comprising lines of codes between the dimension keyword and the next dimension keyword, extracting the dimension data of each of the dimension blocks by reading codes in a line of a string "=" in each of the dimension blocks, converting formats of the dimension data from string types to float types, and storing the dimension data of each of the dimension blocks as one of the structure variable into the structure array;

adding each of the one or more structure variables into corresponding dimension fields in a preset general list;

setting sets an output position in an output report of each of the dimension fields;

outputting each of the dimension fields in the preset general list to the output report according to the output position of each of the dimension fields, and displaying the output report on a display screen of the computing device.

8. The method as claimed in claim 7, wherein the predetermined extraction method comprises obtaining a dimension block in the dimension file if there is no next dimension keyword after the dimension keyword in the dimension file, the dimension block comprising lines of code between the dimension keyword and a blank line in the dimension file, and the dimension data of each of the dimension blocks comprising an identifier (ID) number, a nominal value, an upper tolerance, and a lower tolerance corresponding to the ID number.

9. The method as claimed in claim 8, wherein the dimension fields in the preset general list comprises a field of the ID number, a field of the nominal, a field of the upper tolerance and a field of the lower tolerance corresponding to the dimension data.

10. The method as claimed in claim 8, further comprising:

displaying the preset general list with the added dimension data on the display screen;

managing the dimension data in the preset general list by deleting one of at least two rows of the dimension data having same ID numbers, sorting and/or editing the dimension data in the preset general list according to user preferences.

11. The method as claimed in claim 7, further comprising:

setting a storage path of the output report, and storing the output report in the storage system according the storage path.

12. The method as claimed in claim 7, wherein the output report is a spreadsheet format for displaying the dimension data.

13. A non-transitory computer readable storage medium storing a set of instructions, when executed by at least one processor of a computing device, cause the at least one processor to perform a method for managing menus using the computing device, the method comprising:

reading a dimension file of a workpiece from a storage system of the computing device, and searches the dimension file for at least one dimension keyword;

extracting dimension data from the dimension file according to the at least one dimension keyword using a predetermined extraction method, and storing the dimension data as one or more structure variables into a structure array in a storage system, under the condition that the dimension file comprises the at least one dimension keyword, the predetermined extraction method comprising obtaining one or more dimension blocks in the dimension file if there is the next dimension keyword after the dimension keyword and the dimension blocks comprising lines of codes between the dimension keyword and the next dimension keyword, extracting the dimension data of each of the dimension blocks by reading codes in a line of a string "=" in each of the dimension blocks, converting formats of the dimension data from string types to float types, and storing the dimension data of each of the dimension blocks as one of the structure variable into the structure array;

adding each of the one or more structure variables into dimension fields in a preset general list;

setting sets an output position in an output report of each of the dimension fields;

outputting each of the dimension fields in the preset general list to the output report according to the output position of each of the dimension fields, and displaying the output report on a display screen of the computing device.

14. The non-transitory computer readable storage medium as claimed in claim 13, wherein the predetermined extraction method comprises obtaining a dimension block in the dimension file if there is no next dimension keyword after the dimension keyword in the dimension file, the dimension block comprising lines of code between the dimension keyword and a blank line in the dimension file, and the dimension data of each of the dimension blocks comprising an identifier (ID) number, and a nominal value, an upper tolerance, and a lower tolerance corresponding to the ID number.

15. The non-transitory computer readable storage medium as claimed in claim 14, wherein the dimension fields in the preset general list comprises a field of the ID number, a field of the nominal, a field of the upper tolerance and a field of the lower tolerance corresponding to the dimension data.

16. The non-transitory computer readable storage medium as claimed in claim 14, further comprising:

displaying the preset general list with the added dimension data on the display screen;

managing the dimension data in the preset general list by deleting one of at least two rows of the dimension data having same ID numbers, sorting and/or editing the dimension data in the preset general list according to user preferences.

17. The non-transitory computer readable storage medium as claimed in claim 13, further comprising:

setting a storage path of the output report, and storing the output report in the storage system according the storage path.

18. The non-transitory computer readable storage medium as claimed in claim 13, wherein the output report is a spreadsheet format for displaying the dimension data.

* * * * *